(12) United States Patent
Song

(10) Patent No.: US 7,640,439 B2
(45) Date of Patent: Dec. 29, 2009

(54) MAIN POWER OFF-DELAY DEVICE FOR THE POWER SUPPLY OF COMPUTER SYSTEM

(75) Inventor: Jimmy Song, Taoyuan (TW)

(73) Assignee: Enermax Technology Corporation, Taoyuan (TW)

( * ) Notice: Subject to any disclaimer, the term of this patent is extended or adjusted under 35 U.S.C. 154(b) by 196 days.

(21) Appl. No.: 11/156,916

(22) Filed: Jun. 21, 2005

(65) Prior Publication Data

US 2006/0288242 A1   Dec. 21, 2006

(51) Int. Cl.
*H02P 3/00* (2006.01)

(52) U.S. Cl. ........................ 713/300; 318/471; 318/472; 318/473

(58) Field of Classification Search ................ 713/300; 318/471–473
See application file for complete search history.

(56) References Cited

U.S. PATENT DOCUMENTS

| | | | | |
|---|---|---|---|---|
| 6,058,059 A | * | 5/2000 | Huang et al. | 365/207 |
| 6,163,087 A | * | 12/2000 | Huang et al. | 307/64 |
| 6,538,480 B2 | * | 3/2003 | Takada et al. | 327/108 |
| 7,137,015 B2 | * | 11/2006 | Su | 713/300 |
| 7,458,781 B2 | * | 12/2008 | Lee | 417/18 |
| 2004/0179316 A1 | * | 9/2004 | Tsai | 361/103 |

* cited by examiner

*Primary Examiner*—Abdelmoniem Elamin
(74) *Attorney, Agent, or Firm*—Muncy, Geissler, Olds & Lowe, PLLC

(57) ABSTRACT

A main power off-delay device for a power supply of a computer system is described, which comprises a control device connected to the outer power supply or disposed on a circuit board of a computer system host. Using the switch electrically coupled to a circuit of said control device and the transmitted signals, main power and standing power are continuously supplied by the power supply when the computer operational system is turned off.

5 Claims, 4 Drawing Sheets

MAIN POWER OFF-DELAY DEVICE FOR THE POWER SUPPLY OF COMPUTER SYSTEM

FIELD OF THE INVENTION

The present invention relates to a main power off-delay device for a power supply of a computer system that comprises a control device connected to the outer power supply or disposed on a circuit board of a computer system host. Using the switch electrically coupled to a circuit of said control device and the transmitted signals, main power and standing power are continuously provided by the power supply when the computer operational system is turned off.

BACKGROUND OF THE INVENTION

Generally, computer hosts are equipped with power supplies that chiefly transfer alternating current into stable direct current with different voltage and provide the same for hardware and periphery equipment of computer systems. The switched power supplies and the hosts all require steady and reliable heat sinks to maintain the systems operating normally. Therefore, almost power supplies, hosts, or periphery equipment are provided with heat sinks to lower the high temperature induced thereby, so as to prevent the system, relevant equipment or hardware from crashing or being damaged due to superheat therein.

As illustrated in FIG. 4, which shows a power-supply method of a conventional power supply, the power supply 1 stops operating and transmitting main power (Vout) 11 to the computer system host 2 and all the periphery equipment 3 or heat sinks as soon as the computer host system 2 is turned off; hence, the heat sinks inside the power supply 1 or connected to the computer system host 2 or to the environment therein, as well as the periphery equipment 3 instantly lose their power and stop performing. As a result, the temperature inside the computer is kept in the original working state, which is apparently higher than that in a normal environment. A period of time is thus needed to recover the temperature inside the computer as low as that in a normal environment.

As illustrated in FIG. 5, for solving the aforementioned issues, the industry has recently provided a radiating control device that utilizes a control circuit 13 disposed in a power supply 1. When a computer system host 2 instructs a command to turn off main power (Vout) 11 of the power supply 1, related heat sinks keep performing by means of standing power 12 (Vout) continuously supplied by the control circuit 13 until a setting time is up or the temperature is lowered to a predetermined value.

As above, after main power 11 is turned off, more than one heat sink remains running, of which required voltages are different. Consequently, the standing power 12 of the power supply 1 is not adequate for different requirements. Furthermore, other periphery equipment cannot be retained to perform basic operations.

SUMMARY OF THE INVENTION

It is one object of the present invention to provide a main power off-delay device for a power supply of a computer system, which comprises a control device connected to the outer of a power supply or disposed on a circuit board of a computer system host. Using the switch electrically coupled to a circuit of said control device and the transmitted signals, main power and standing power of the power supply are still provided for the computer system host, heat sinks of hardware and other primary periphery equipment after the computer operational system is shut off; hence, the hardware keeps radiating to protect itself and the periphery equipment keeps performing when the computer system is shut off.

BRIEF DESCRIPTION OF THE DRAWINGS

The foregoing aspects, as well as many of the attendant advantages and features of this invention will become more apparent by reference to the following detailed description, when taken in conjunction with the accompanying drawings, wherein.

DESCRIPTION OF SOME EMBODIMENTS

The present invention provides a main power off-delay device for a power supply of a computer system comprising a control device connected to the outer power supply or disposed on a circuit board of a computer system host, and a circuit of said control device is electrically coupled between the power supply and the computer system host. When the computer operational system is shut off and transmits a power-off signal to said control device, said control device detects environmental temperature of the computer system or periphery equipment and compares the environmental temperature with a predetermined value, and a timer starts clocking to control the power signal being on/off, rendering the power supply to provide main power and standing power for the computer system host, heat sinks of hardware and the periphery equipment to keep performing.

Accordingly, a main power off-delay device for a power supply of a computer system is disclosed, which comprises a control device connected to the outer of a power supply or disposed on a circuit board of a computer system host. Using the switch electrically coupled to a circuit of said control device and the transmitted signals, main power and standing power of the power supply are still provided for the computer system host, heat sinks of hardware and other primary periphery equipment after the computer operational system is shut off. The computer operational system is turned on or turned off using power good (PG) signal or power failed (PF) signal, respectively. Since power is controlled to be continuously supplied, the hardware keeps radiating to protect itself and the periphery equipment keeps performing when the computer operational system is shut off.

In accordance with the present invention, when the computer operational system is turned off and transmits a power-off signal to said control device, said control device detects the environmental temperature of the computer system or the periphery equipment and compares the environmental temperature with a predetermined value, and a timer provides clock information to control the switch of the power signal, by which the power supply continues providing main power and standing power for the system, heat sinks of hardware and the periphery equipment to perform.

Figure 1:
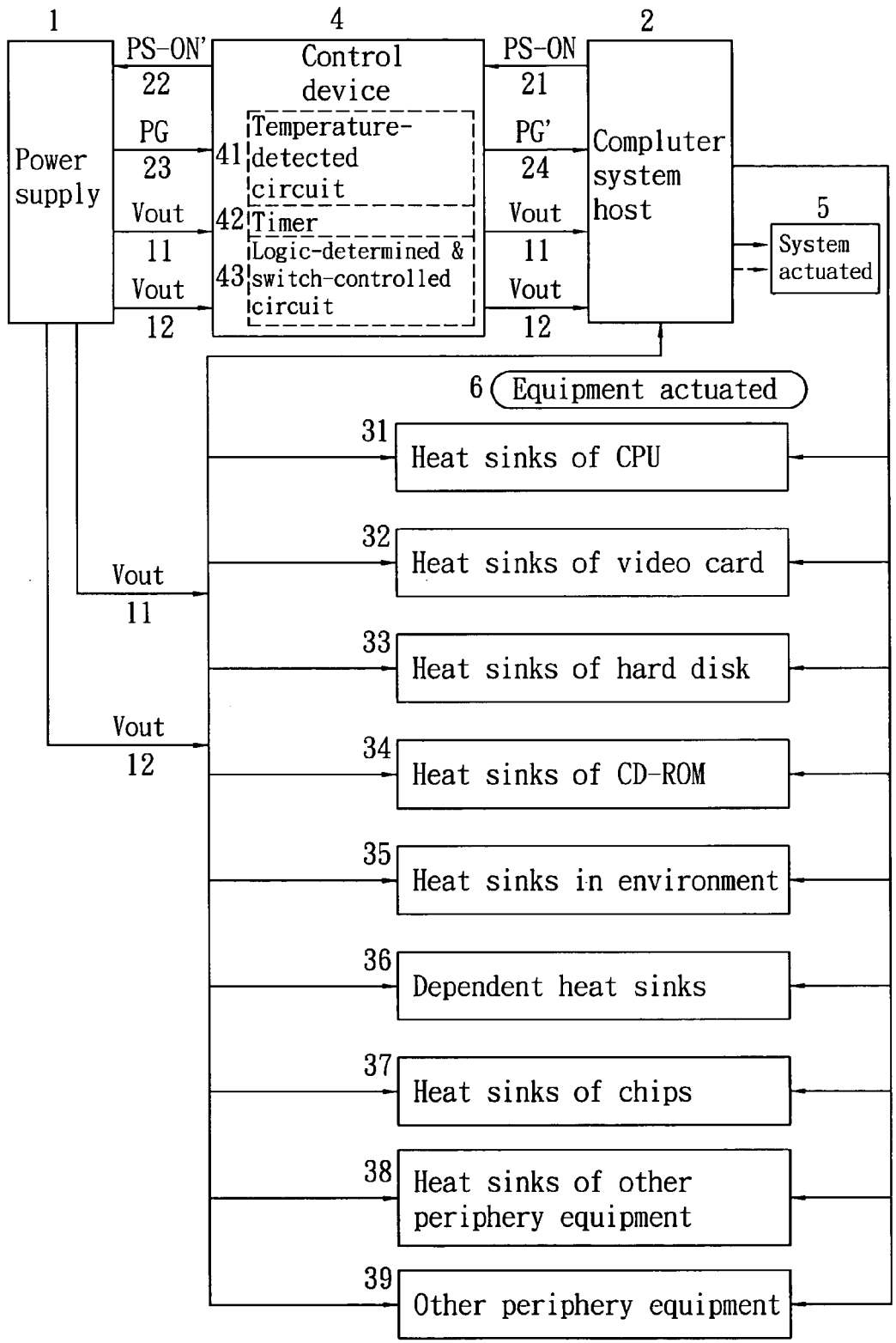
FIG. 1 illustrates a diagram of turning on the system according to a preferred embodiment of the present invention.

Referring to FIG. 1, a main power off-delay device for a power supply of a computer system of the present invention comprises a control device 4 connected to the outer of a power supply 1 or disposed on a circuit board of a computer system host 2, wherein a circuit of said control device 4 is electrically coupled between the power supply 1 and the computer system host 2.

Also referring to FIG. 1, said control device 4 comprises a temperature-detected circuit 41, a timer 42, and a logic-determined and switch-controlled circuit 43, wherein said temperature-detected circuit 41 detects environmental temperature of the computer system or the periphery equipment and compares the environmental temperature with a predetermined value, and if the environmental temperature is lower than the predetermined value, said temperature detected circuit 41 transmits a non-overheated signal to said logic-determined and switch-controlled circuit 43 of said control device 4; said timer 42 starts clocking when receiving a power-off signal, and outputs a clock signal to said logic-determined and switch-controlled circuit 43 of said control device 4 until a setting time is up.

The control device 4 of the present invention comprises hardware circuits or software programming chips. When the computer is powered on, the computer system host 2 transmits a power-on signal (PS-ON) 21 to the control device 4 that presently transmits a quasi-power-on signal 22 (PS-ON') to the power supply 1.

The power supply 1 transmits a power good signal 23 (PG) to the control device 4 after being turned on, and a quasi-power good signal 24 (PG') is transmitted by the control device 4 to the computer system host 2, so as to actuate the computer system 5; meanwhile, the power supply 1 provides main power (Vout) 11 and standing power (Vout) 12 for the computer system host 2 and the related hardware, such as heat sinks 31 of CPU, heat sinks 32 of video card, heat sinks 33 of hard disk, heat sinks 34 of CD-ROM, heat sinks 35 in computer environment, dependent heat sinks 36, heat sinks 37 of chips, heat sinks 38 of other periphery equipment, and other periphery equipment 39; at this time, the equipment is actuated 6.

Figure 2:
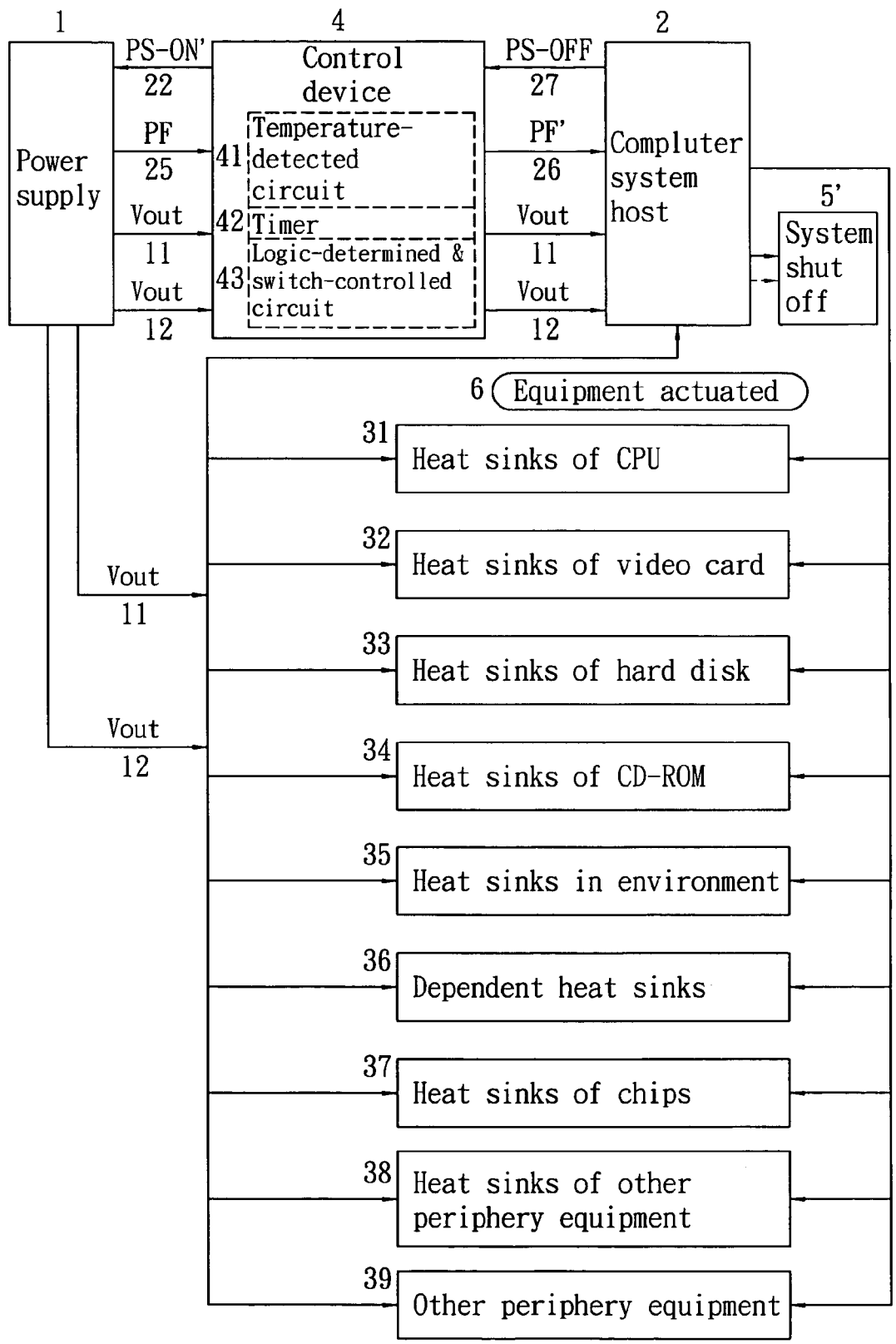
FIG. 2 illustrates a diagram of turning off the system according to a preferred embodiment of the present invention.

As illustrated in FIG. 2, when the operational system of the computer system host 2 is shut down, the control device 4 receives a power-off signal 27 (PS-OFF) from the computer system host 2; meantime, the temperature-detected circuit 41 of the control device 4 detects the input of temperature, and the timer 42 starts clocking. If both the temperature and the clocking time, or one of which, are lower than a predetermined value, then the control device 4 remains transmitting the quasi-power-on signal (PS-ON') 22 to the power supply 1 for continuously providing main power 11 and standing power 12. The power supply 2 transmits a power failed signal (PF) 25 to the control device 4, and a quasi-power failed signal (PF') 26 is presently output to the computer system host 2 and interrupts power to turn off the operational system, rendering the computer system to be shut off 5'. On the contrary, the power supply 1 still provides main power 11 and standing power 12, so that heat sinks 31-38 and other primary periphery equipment 39 are actuated 6.

Figure 3:
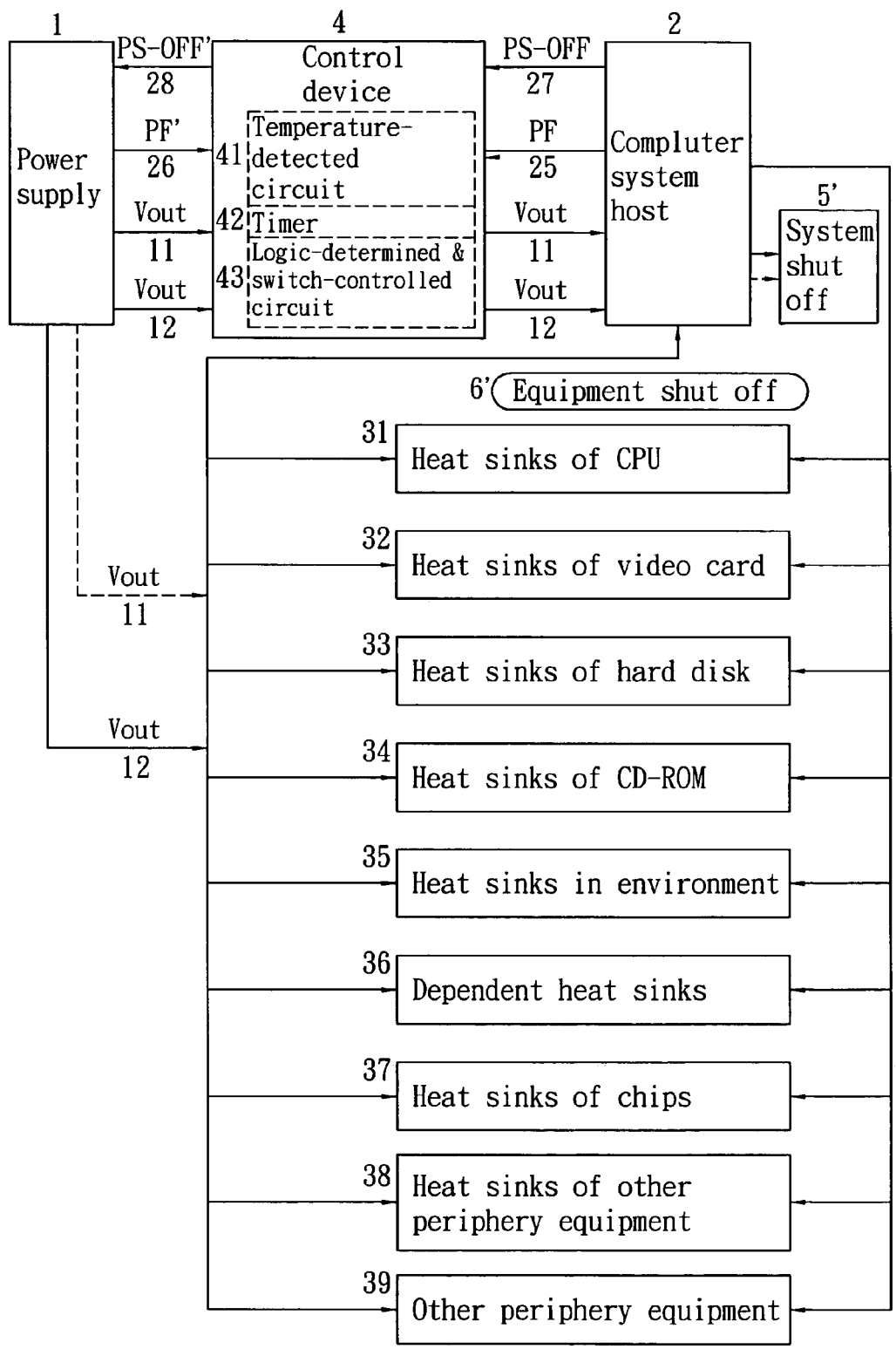
FIG. 3 illustrates a diagram of powering off the system according to a preferred embodiment of the present invention.
Figure 4:
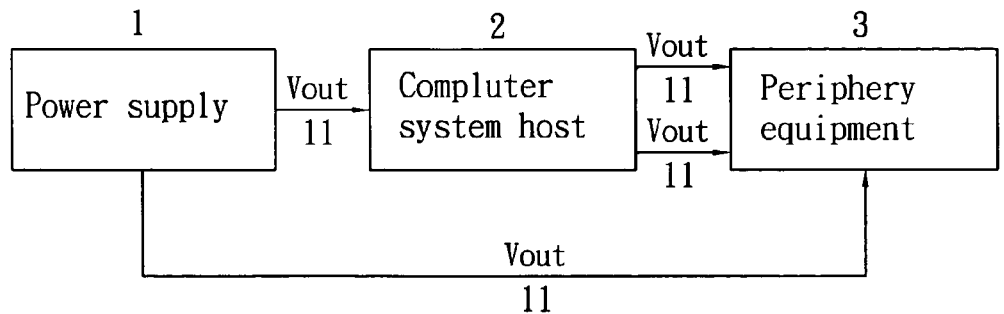
FIG. 4 illustrates a diagram for supplying power by a conventional power supply.
Figure 5:
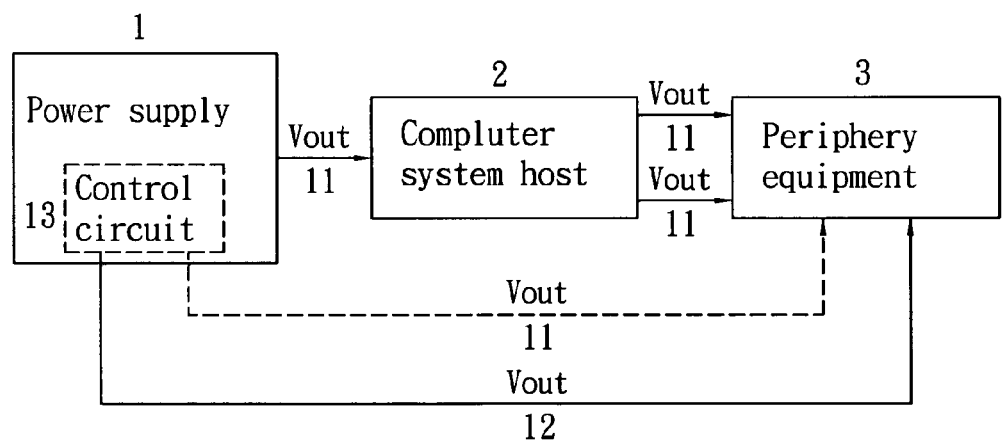
FIG. 5 illustrates a diagram for supplying power by off-delay circuit of a conventional power supply.

As illustrated in FIG. 3, if both the temperature detected by the temperature-detected circuit 41 and the clocking time reckoned by the timer 42 are achieved at a predetermined value after the computer system is shut off 5', the control device 4 transmits a quasi-power-off signal (PS-OFF') 28 and a quasi-power failed signal (PF') 26 to the power supply 1 (thereupon the computer system host 2 transmits a power-off signal (PS-OFF) 27 and a power failed signal (PF) 25 to the control device 4), in order to instruct the same to stop providing main power 11 but standing power 12. At this time, the computer system shut off 5' and the equipment shut off 6' are essentially turned off and stop performing.

In one embodiment of the present invention, the control device 4 in use can omit the timer 42, and remains the temperature-detected circuit 41 and the logic-determined and switch-controlled circuit 43 to delay the hardware radiating and to provide the primary periphery equipment operating.

In another embodiment of the present invention, the control device 4 in use can omit the temperature-detected circuit 41, and remains on the timer 42 and the logic-determined and switch-controlled circuit 43 to delay the hardware radiating and to provide the primary periphery equipment operating.

The aforementioned embodiments of the present invention are intended to be illustrative only. Numerous alternative embodiments may be devised by those skilled in the art without departing from the scope of the following claims.

What is claimed is:

1. A main power off-delay device for a power supply of a computer system, the device comprising:
    a control device 4 connected to the outer power supply 1 or disposed on a circuit board of a computer system host 2, wherein said control device 4 with hardware circuits or software programming chips comprises a temperature-detected circuit 41, a logic-determined and switch-controlled circuit 43, and a timer 42, when receiving a power-off signal, a overheated signal from the temperature-detected circuit and a clock signal from the timer, said control device outputs the power-off signal and interrupts power to turn off the computer system and maintains both the power supply providing main power and standing power for heat sinks of primary periphery equipment, and thereby the heat sinks of the primary periphery equipment keep performing when the computer system is turned off,
    wherein said control device 4 comprises:
        a temperature-detected circuit 41 for detecting environmental temperature of a computer system and comparing the environmental temperature with a predetermined value, if the environmental temperature is lower than the predetermined value, said temperature-detected circuit 41 transmits a non-overheated signal to said logic-determined and switch-controlled circuit 43 of said control device 4; and
        a timer 42 starting clocking when receiving a power-off signal, and outputting a clock signal to said logic-determined and switch-controlled circuit 43 of said control device 4 until a setting time is up and a non-overheated signal is provided.

2. The device of claim 1, wherein said logic-determined and switch-controlled circuit 43 logically determines a non-overheated signal detected by said temperature-detected circuit 41 and a time value reckoned by said timer, and controls an output of a power-off signal accordingly.

3. The device of claim 1, wherein said control device 4 in use omits said timer 42, and remains said temperature-detected circuit 41 and said logic-determined and switch-controlled circuit 43 to delay the hardware radiating and to provide the primary periphery equipment operating.

4. The device of claim 1, wherein said control device 4 in use omits said temperature-detected circuit 41, and remains said timer 42 and said logic-determined and switch-controlled circuit 43 to delay the hardware radiating and to provide the primary periphery equipment operating.

5. The device of claim 1, wherein the primary periphery equipment is selected from the list consisting of a CPU, a fan, a video card, a hard disk, an optical drive, a computer chip, and a peripheral card.

* * * * *